(12) United States Patent
Kryze et al.

(10) Patent No.: US 9,152,236 B2
(45) Date of Patent: *Oct. 6, 2015

(54) APPARATUS FOR REMOTELY CONTROLLING ANOTHER APPARATUS AND HAVING SELF-ORIENTATING CAPABILITY

(71) Applicant: Panasonic Corporation, Osaka (JP)

(72) Inventors: David Kryze, Campbell, CA (US); Zia Syed, San Jose, CA (US); Luca Rigazio, San Jose, CA (US); Tiffany Yun, Fremont, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,843

(22) Filed: Jul. 28, 2014

(65) Prior Publication Data

US 2014/0333562 A1 Nov. 13, 2014

Related U.S. Application Data

(63) Continuation of application No. 12/979,790, filed on Dec. 28, 2010, now Pat. No. 8,823,645.

(51) Int. Cl.
*G06F 3/01* (2006.01)
*G06F 1/26* (2006.01)
*G06F 1/32* (2006.01)
(Continued)

(52) U.S. Cl.
CPC ............... *G06F 3/017* (2013.01); *G06F 1/266* (2013.01); *G06F 1/3259* (2013.01); *G06F 3/038* (2013.01); *G06F 3/0346* (2013.01); *G06F 3/041* (2013.01); *G06F 3/0416* (2013.01); *G06F 3/04883* (2013.01); *G08C 17/00* (2013.01); *H04N 5/4403* (2013.01); *H04N 21/42222* (2013.01); *H04N 21/42224* (2013.01); *G08C 2201/32* (2013.01);
(Continued)

(58) Field of Classification Search
CPC ....... G06F 3/017; G06F 3/038; G06F 3/0416; G06F 3/04883; G06F 3/0346; G06F 1/266; G06F 1/3259; H04N 21/42222
USPC ................................. 345/156, 157, 163, 173
See application file for complete search history.

(56) References Cited

U.S. PATENT DOCUMENTS 7,176,886 B2 * 2/2007 Marvit et al. ................. 345/156
7,239,301 B2 7/2007 Liberty et al. ................ 345/158
(Continued)

OTHER PUBLICATIONS

Anupam. Eco Gadgets: Shake Control—Magnet-powered remote control says goodbye to batteries, The Instablogs Network, Citizen Media Pvt. Ltd. [online] Dec. 24, 2008 [retrieved on Jan. 31, 2011]. Retrieved from the Internet <URL: http://www.ecofriend.org/entry/eco-gadgets-shake-control-magnet-powered-remort-control-says-goodbye-to-batteries/>.
(Continued)

*Primary Examiner* — Ilana Spar
(74) *Attorney, Agent, or Firm* — Panasonic Patent Center (57) ABSTRACT

An apparatus for communicating with a target device includes: a sensing portion for sensing points of user contact with the apparatus and user gestures; a transmitting device for sending signals representative of user commands to the target device; a controller; and a memory including instructions for configuring the controller to perform a self-orientation process to determine a forward direction of a plane of operation for defining the user gestures.

5 Claims, 9 Drawing Sheets

(51) Int. Cl.

| | |
|---|---|
| *G06F 3/041* | (2006.01) |
| *H04N 21/422* | (2011.01) |
| *G06F 3/038* | (2013.01) |
| *G06F 3/0488* | (2013.01) |
| *G06F 3/0346* | (2013.01) |
| *H04N 5/44* | (2011.01) |
| *G08C 17/00* | (2006.01) |
| *H02J 7/00* | (2006.01) |

(52) U.S. Cl.
CPC ............ *H02J 7/0054* (2013.01); *Y02B 60/1253* (2013.01); *Y02B 60/148* (2013.01)

(56) References Cited

U.S. PATENT DOCUMENTS

| | | | |
|---|---|---|---|
| 7,469,381 B2 | 12/2008 | Ording | 715/702 |
| 7,598,942 B2 | 10/2009 | Underkoffler et al. | 345/158 |
| 2006/0178212 A1 | 8/2006 | Penzias | 463/37 |
| 2007/0247420 A1 | 10/2007 | Strohband et al. | 345/156 |
| 2008/0048993 A1 | 2/2008 | Yano | 345/173 |
| 2008/0273010 A1 | 11/2008 | Newman et al. | 345/157 |
| 2009/0002217 A1 | 1/2009 | Kryze et al. | 341/176 |
| 2009/0002218 A1* | 1/2009 | Rigazio et al. | 341/176 |
| 2009/0262073 A1 | 10/2009 | Rigazio et al. | |
| 2009/0262086 A1 | 10/2009 | Chen | 345/173 |
| 2010/0073318 A1 | 3/2010 | Hu et al. | |
| 2011/0057891 A1 | 3/2011 | Ham et al. | 345/173 |

OTHER PUBLICATIONS

Toto, Serkan. Puycon: Ball-shaped, squeezable input interface (videos), CrunchGear [online]. Jan. 12, 2010 [retrieved on Jan. 21, 2011]. Retrieved from the Internet <URL: http://www.crunchgear.com/2010/01/12/puyocon-ball-shaped-squeezable-input-interface-videos/>.

Yun, Tiffany et al., U.S. Appl. No. 12/732,087, filed Mar. 25, 2010, entitled "Physically Reconfigurable Input and Output Systems and Methods".

* cited by examiner

APPARATUS FOR REMOTELY CONTROLLING ANOTHER APPARATUS AND HAVING SELF-ORIENTATING CAPABILITY

CROSS-REFERENCE TO RELATED APPLICATIONS

The present application is a continuation application of U.S. application Ser. No. 12/979,790 filed on Dec. 28, 2010, the contents of which are incorporated herein by reference.

The present application incorporates by reference the contents of:

U.S. application Ser. No. 11/977,348 filed on 24 Oct. 2007, which is entitled "Touchpad-Enabled Remote Controller and User Interaction Methods";

U.S. application Ser. No. 12/115,102 filed on 5 May 2008, which is entitled "Direction and Holding-Style Invariant, Symmetric Design, Touch and Button based Remote User Interaction";

U.S. application Ser. No. 12/235,862 filed on 23 Sep. 2008 which is entitled "Touch Sensitive Remote Control System that Detects Hand Size Characteristics of User and Adapts Mapping to Screen Display";

U.S. application Ser. No. 12/237,143 filed on 24 Sep. 2008 which is entitled "Multi-touch Surface Providing Detection and Tracking of Multiple Touch Points"; and U.S. application Ser. No. 12/732,087 filed on 25 Mar. 2010 which is entitled "Physically Reconfigurable Input and Output Systems and Methods".

TECHNICAL FIELD

The technical field relates generally to an apparatus for remotely controlling another apparatus and, more particularly, to an apparatus which can recognize user actions and gestures for generating commands to remotely control another apparatus.

BACKGROUND

A conventional apparatus for remotely controlling (commonly referred to as a remote controller) a target device such as a television or other consumer electronic equipment includes a radio frequency (RF) transceiver for sending signals representing control commands to the television. However, such a remote controller must be properly oriented by the user toward the television so that the signals are successfully received by the television.

The remote controller can include a power source such as a battery. When the useful operating period of the battery has been exhausted, the user will have to install a new battery in order to continue to use the remote controller.

Further, if the remote controller is used to control a different device such as another television, a burdensome association process may have to be performed so that the remote controller can communicate with the television.

SUMMARY

An apparatus such as a remote controller according to various exemplary embodiments can perform a self-orientation process so that it can properly communicate with a target device regardless of its initial orientation.

Different user characteristics may affect the calculations for achieving self-orientation. The remote control device according to the various exemplary embodiments can recognize characteristics particular to the user in order to achieve a more accurate self-orientation.

The remote controller can be used to control a target device such as a computing terminal. The remote controller and the computing terminal may share a common docking station as a base. In this case, the remote control according to the various exemplar) embodiments can receive power and/or power charging capability from the common docking station. Further, the remote control device according to the various exemplar) embodiments can pair with the computing terminal so that the two can communicate by merely locating the remote control device on or near the common docking station.

Accordingly, the present disclosure concerns an apparatus for communicating with a target device including: a sensing portion for sensing points of user contact with the apparatus, user gestures, and an acceleration value of the apparatus; a transmitting device for sending signals representative of user commands to the target device; a controller; and a memory including instructions for configuring the controller to perform a self-orientation process based upon at least one of the acceleration value and the points of user contact to determine a forward direction of a plane of operation for defining the user gestures, wherein an axis of the determined plane of operation substantially intersects the apparatus at any angle. The controller can be configured to interpret the user gestures and generate the signals representative of the user commands based upon the interpreted user gestures.

The apparatus can further include a casing permitting signals to be transmitted substantially along the axis of the plane of operation. The casing can have a top portion, a wall portion and a bottom portion. A magnetic portion disposed on at least a portion of one of the wall portion, the top portion and the bottom portion of the casing permits the apparatus to be attached with another magnetic surface. The sensing portion can include a touch sensor layer disposed on a portion of at least one of the wall portion, the top portion and the bottom portion for receiving the user gestures.

The touch sensor layer can have a flexible surface with a selectively variable shape. The sensing portion includes an actuation sensing component for sensing actuation activity associated with the shape in the touch sensor layer. The flexible surface and actuation sensing component interact to provide both input and output to a user of the apparatus. The flexible surface may have a selectively variable shape. The actuation sensing component can sense actuation activity associated with the shape in the surface. Further, the apparatus may include elevation units that adjust a physical shape of an input and output surface area, wherein the controller is further configured to adjust particular ones of the elevation units.

The apparatus can include a power management unit and an antenna portion coupled to the power management unit. The antenna portion can bee configured to receive power from a base device. Further, the power management unit can be configured to recharge a rechargeable power source utilizing the received power. The antenna portion can include a radio frequency antenna for receiving the power by radio frequency communication, a coil antenna for receiving the power by magnetic coupling or a capacitive plate antenna for receiving the power by capacitive coupling.

The sensing portion can sense if the apparatus is within a predetermined distance of a base device or the target device; and the controller is further configured to generate a signal representative of an identification of the apparatus to be transmitted by the transmitting device to the base device or the target device when the apparatus is within the predetermined distance.

The transmitting device can include the antenna portion and the controller can be configured to control the transmitting device to transmit to the base device or the target device a signal including characteristics particular to the antenna portion as an identification of the apparatus when the apparatus is within the predetermined distance.

The apparatus can also includes a receiving device for receiving a request to associate the apparatus with a base device or the target device, wherein the controller is further configured to generate a signal representative of an identification of the apparatus to be transmitted by the transmitting device to the base device or the target device when the apparatus receives the request.

The apparatus can further includes a user input portion for receiving a request to associate the apparatus with a base device or the target device, wherein the controller is further configured to generate a signal representative of an identification of the apparatus to be transmitted by the transmitting device to the base device or the target device when the apparatus receives the request.

The sensing portion can senses motion characteristics associated with a user of the apparatus. The controller can be configured to generate a signal representative of the motion characteristics by the transmitting device to a base device or the target device. The sensed motion characteristics include data represented in the time domain. The controller is further configured to shift the data represented in the time domain to be data represented in the frequency domain, and to extract low-dimensional data with high discriminating properties from the date represented in the frequency domain to generate the signal representative of the motions characteristics.

For example, the sensed motion characteristics include one of a user tremor pattern and a user movement range.

The controller can be configured to store in the memory a gesture motion history, and to generate a signal representative of the gesture motion history to be transmitted by the transmitting device to a base device or the target device.

The apparatus can also include a receiving device for receiving a user feedback request from another device; and a user feedback device for providing user feedback, wherein the controller is further configured to control the user feedback device to provide the user feedback when the receiving device receives the user feedback request.

An apparatus according to an embodiment includes a sensing portion for sensing points of user contact with the apparatus and an acceleration value of the apparatus; a controller; and a memory including instructions for configuring the controller to perform a self-orientation process based upon at least one of the acceleration value and the points of user contact to define a forward direction of user gestures, wherein the forward direction can be fixed along any angle with the apparatus.

An apparatus according to an embodiment includes an accelerometer for determining an acceleration value associated with the apparatus; a gyroscope for measuring angular rotation associated with the apparatus to provide an orientation value; a touch sensor for sensing points of user contact with the apparatus; and a self-orientation determination device for determining a plane of operation defining user gestures based upon the acceleration value, orientation value and points of user contact, wherein the plane of operation is rotatable at any angle of the apparatus.

The touch sensor can be disposed on a portion of at least one of a wall portion, a top portion and a bottom portion of the apparatus for detecting the user gestures, and the apparatus further includes: a gesture type determining device for determining if the user gesture is an absolute-type gesture or a relative-type gesture; a gesture direction determination device for determining a direction of the absolute-type gesture; and a gesture interpretation device for interpreting the absolute-type gesture and relative-type gesture as user commands.

A system according to an embodiment includes a remote control device for remotely controlling a target device. The target device includes an interface for receiving signals representative of user commands wirelessly from the remote control device; and a controller for executing instructions based upon the user commands. The remote control device includes: a sensing portion for sensing points of user contact with the apparatus, user gestures, and an acceleration value of the remote control device; a transmitting device for sending the signals representative of the user commands to the target device; a controller; a memory including instructions for configuring the controller to perform a self-orientation process based upon at least one of the acceleration value and the points of user contact to determine a forward direction of a plane of operation for defining the user gestures, and to interpret the user gestures as the user commands; and a transmitting device for sending signals representative of the user commands to the target device, wherein an axis of the determined plane of operation substantially intersects the remote control device at any angle.

A method of remotely communicating user commands from a first apparatus to a target apparatus based upon user gestures input at the first apparatus according to an embodiment includes: sensing points of user contact with the first apparatus and an acceleration value of the remote control device; determining a forward direction of a plane of operation based upon at least one of the acceleration value and the points of user contact, wherein the plane of operation defines an input space for the user gestures and the plane of operation substantially intersects the first, apparatus at any angle; interpreting the user gestures into the user commands; and transmitting signals representative of the user commands to the target apparatus.

BRIEF DESCRIPTION OF THE DRAWINGS

The accompanying figures, in which like reference numerals refer to identical or functionally similar elements, together with the detailed description, below are incorporated in and form part of the specification and serve to further illustrate various exemplary embodiments and explain various principles and advantages in accordance with the present invention.

DETAILED DESCRIPTION

In overview, the present disclosure concerns an apparatus to be used as a remote control device for remotely controlling another electronic apparatus such as a television, a communication device, a computing device or a base device. The remotely controlled electronic apparatus will be referred to sometimes here generally as a target device or target apparatus. The apparatus for remotely controlling the target device will be referred to sometimes here generally as a remote control device or remote control apparatus. The remote control device may be implemented within a system including the base device and one or more target devices.

The present disclosure also concerns processors for the remote control device, base device and the target device, memories associated with the processors, and computer readable instructions stored in the memories for configuring the processors. More particularly, various inventive concepts and principles are embodied in systems, apparatuses, and methods for establishing a plane of operation to define user gestures input by a user of the remote control device, and to interpret the user gestures.

The instant disclosure is provided to further explain in an enabling fashion the best modes of performing one or more embodiments of the present invention. The use of relational terms such as first and second, top and bottom, and the like, if any, are used solely to distinguish one from another entity; item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and the inventive principles when implemented, are best supported with or in computer instructions (software) or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions orJCs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Figure 1:
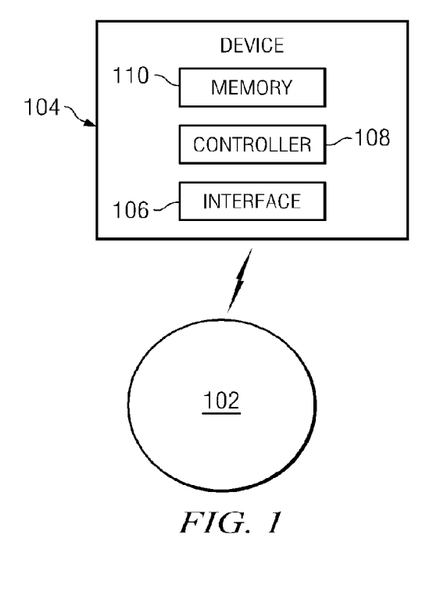
FIG. 1 is a schematic diagram illustrating a simplified and representative operating environment in which an apparatus remotely controls a target apparatus.

Referring to FIG. 1, a simplified and representative operating environment in which a method, system or apparatus for remotely controlling a target device is implemented will be discussed with regards to the remote control device 102 and the target device 104. The remote control device 102 transmits signals representative of user commands wirelessly to the target device 104 and can also receives signals representative of messages from the target device 104. The user commands may include commands for changing the operation of the target device 104 such as adjusting the volume output, screen arrangement, etc. The target device 104 can include an interface 106, a controller 108 and a memory 110. The interface 106 wirelessly receives the signals representative of the user commands and transmits the signals representative of the messages. The controller 108 executes instructions stored in a memory 110 to adjust properties of the target device 104 such as, for example, volume level, based upon the user commands and generates the signals representative of messages.

Figure 9:
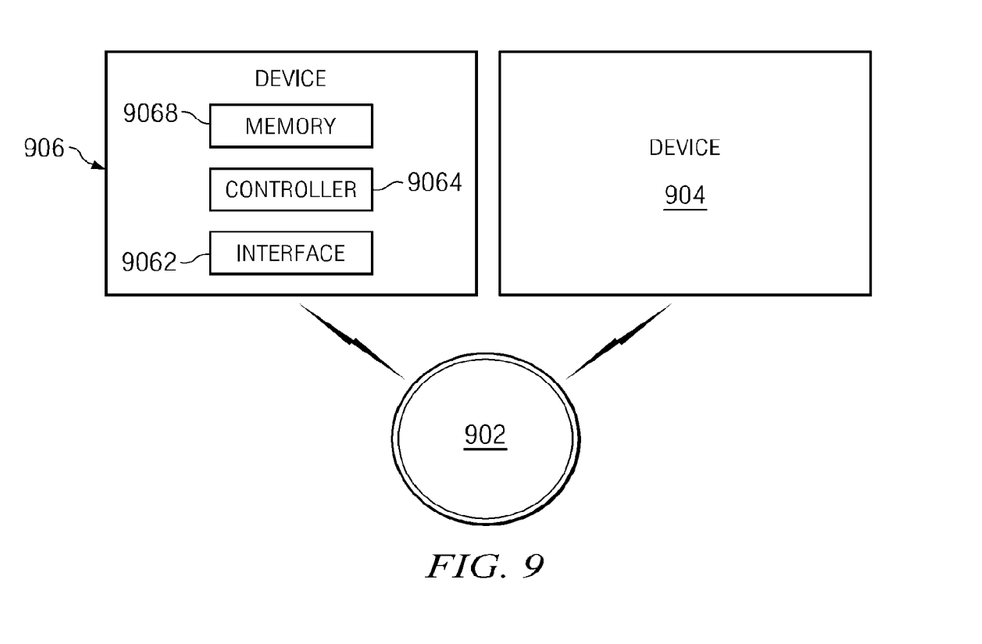
FIG. 9 is a schematic diagram illustrating a simplified and representative operating environment in which the apparatus remotely controls a target apparatus and communicates with a base device.

Referring to FIG. 9, another simplified and representative operating environment in which a method, system or apparatus for remotely controlling a target device is implemented with regards to the remote control device 902, the target device 904 and the base device 906 will be discussed. The base device 906 also includes an interface 9062, a controller 9064 and a memory 9068. The controller 9064 may provide, as well as other capabilities, a charging unit for providing power to the target device 904 and/or the remote control device 902, or to generally function as the main power unit for the system. The base device 906 can be a hub for accessories such as a gesture sensor, telephony system with cradle, speakerphone, printer and etc. For example, the target device 904 can be docked with the base device 906 so that a battery in the target device 904 is recharged. Generally, the base device 906 can be any device capable of sending electrical power to the remote control device 902 as described later.

Figure 3:
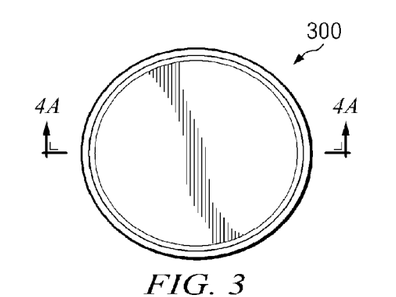
FIG. 3 is a diagram illustrating a top view of the apparatus according to exemplary embodiments.

Referring to FIG. 3, the remote control device 300 preferably has a symmetric shape. A conventional remote control device has a rectangular shape which requires a user to hold the remote control device in oriented towards the target device. In contrast, the symmetric shape of the remote control device 300 does not require a user to orient it toward the target device. Although the shape of this exemplary remote control device 300 is circular, the remote control device 300 may have any symmetric shape.

Figure 4A:
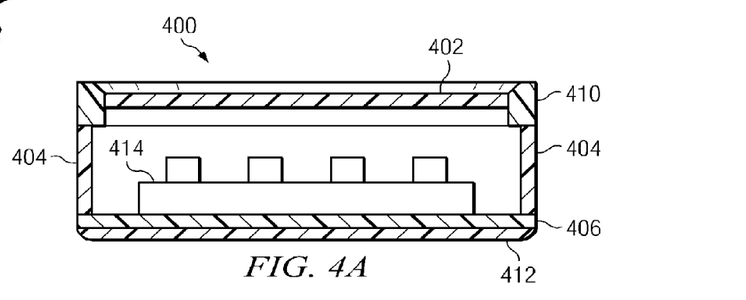
FIG. 4A is a diagram illustrating an exemplary cross-sectional view of the apparatus of FIG. 3 along lines 4A-4A of FIG. 3.
Figure 4B:
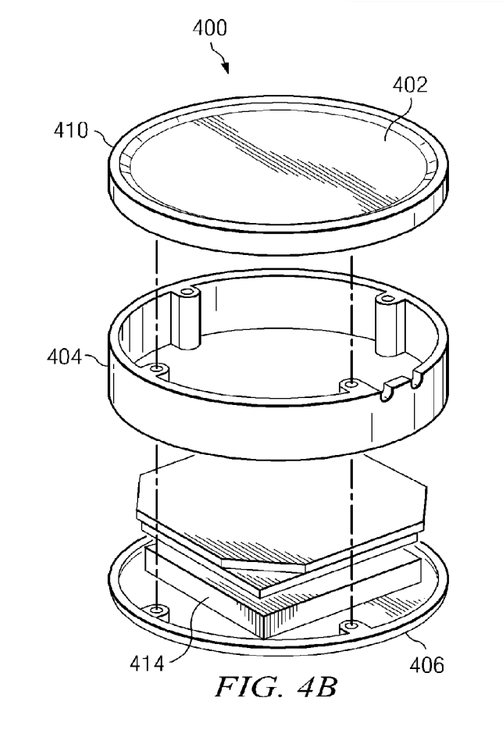
FIG. 4B is an exploded view showing exemplary portions of the apparatus.
Figure 4C:
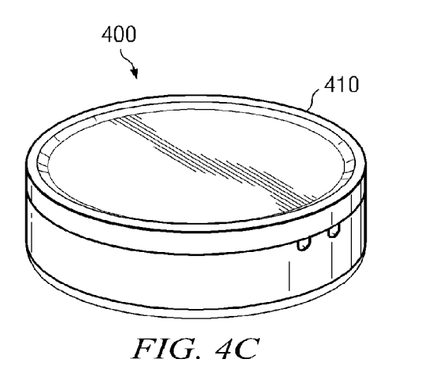
FIG. 4C is a diagram illustrating an elevation view of the apparatus.

Referring to FIGS. 4A-4C, portions of the exemplary remote control device 400 will be discussed. The remote control device 400 includes the symmetrically shaped casing, which has a top portion 402, a wall portion 404, and a bottom portion 406. The casing can include a magnetic portion 412 for permitting the remote control device 400 to be attached with another magnetic surface, a touch sensor layer 410 for detecting user gestures and a circuit board 414 with various circuitries for implementing many of the functions of the remote control device 400. In this embodiment, the touch sensor layer 410 and the magnetic portion 412 are shown as being disposed on the top portion 402 and the bottom portion 406, respectively. However, these portions can be disposed on any portion of one of the wall portion 404, the top portion 402 and the bottom portion 406.

The touch sensor layer 410 can be a capacitive touch surface which is disposed on the top portion 402 as shown in FIG. 4A or around an outside peripheral portion of the top portion 402 or the wall portion 404 as shown in FIGS. 4B-4C. Different fascia can be placed on different portions of the remote control device 400 to suit particular usages and mapped controls. The touch sensor layer 410 can detect where fingers are touching relative to the normal position of a hand, including whether the hand is a right or left hand. The touch sensor layer 410 can also detect non-human touches. For example, a dog biting the remote control device 400 or other situations that would keep the device inactive as opposed to activating the remote control features of the device can be detected by the touch sensor layer 410.

Figure 5:
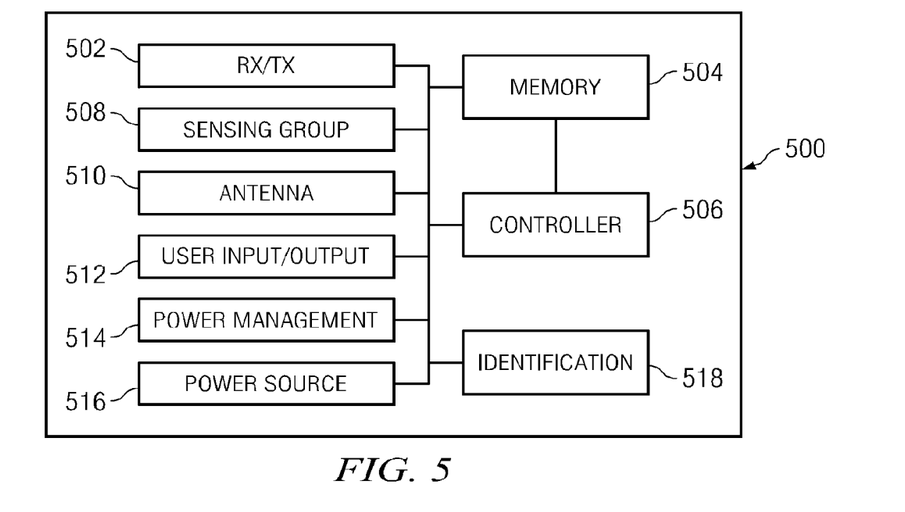
FIG. 5 is a block diagram of exemplary portions of the apparatus according to exemplary embodiments.

Referring to FIG. 5, circuit-level portions of the remote control device 500 will be discussed. The remote control, device 500 can include a transceiver 502, a memory 504, a controller 506, a sensing group 508, an antenna portion 510, a user input/out portion 532, a power management portion 514 and a power source 516.

The transceiver 502 can implement the receiving and transmitting functions of the remote control device 500. Alternatively, the device 500 can include separate receiving and transmitting devices. The transceiver 502 sends and receives signals to and from other devices such as the base device 906 or the target device 904. The signals may include signals representative of user commands, requests to associate the remote control device 500 with another device; an identification of the remote control device 500, etc. The transceiver 502 can include radio technology circuitry such as, for example, ZigBee, Bluetooth and WiFi.

The sensing group 508 includes sensing portions for sensing points of user contact with the remote control device 500, user gestures, an acceleration value of the remote control device 500, motion characteristics associated with a user of the remote control device 500, if the remote control device is within a distance from another device such as the base device 906 or the target device 904. The sensing group 508 can include a set of accelerometers for determining the acceleration value of the device 500, a digital compass that collects orientation information about the device 500, a gyroscope for measuring angular rotation associated with the apparatus to provide an orientation value, a proximity sensor for detecting if the device 500 is within a predetermined distance of another device such as the base device 906 or the target device 904, and the touch sensor layer for sensing the points of user contact and user gestures. The sensed motion characteristics can include one or both of a user tremor pattern and a user movement range. Preferably, the sensed motion characteristics include data represented in the time domain. The accelerometers can detect subtle movements along the three axial directions. The aecelerometer reading, when combined with the data from the digital compass and/or the gyroscope, can facilitate detection of user gesture movements in the air.

The memory 504 can be one or a combination of a variety of types of memory or computer readable medium such as random access memory (RAM), read only memory (ROM), flash memory, dynamic RAM (DRAM) or the like. The memory 504 includes instructions for configuring the controller 506 as well as a basic operating system, executable code, and data and variables such as a gesture motion history.

The controller 506 is the main processing unit for interfacing with the other portions of the remote control device 500. The controller 506 can be configured by the instructions in the memory 504 to: perform a self-orientation process-based upon at least one of the acceleration value and the points of user contact to determine a forward direction of a plane of operation for defining the user gestures; interpret user gestures and generate the signals representative of the user commands based upon the interpreted user gestures; generate a signal representative of an identification of the apparatus to be transmitted to another device such as the base device 906 or the target device 904 when the device 500 is within the predetermined distance of the another device or when the device receives signals representative of a request to associate the remote control device 500 with the another device; generate a signal representative of the motion characteristics and points of user contact; and generally control the various portions of the device 500. The identification can include characteristics particular to the antenna 510. The controller 506 can be a general purpose central processing unit (CPU) or a specific integrated circuit (IC). For example, the controller 506 can be implemented a 32 bit microcontroller.

The identification portion 518 is for storing an identification particular to the device 500. Although the identification portion 518 is illustrated as a separate portion, it can also be integrated, with the antenna 510 or the transceiver 502, or be stored in the memory 504.

The user input/output portion 512 includes: a microphone for allowing a user to initiate voice commands, a vibration mechanism that allows for the device 500 to vibrate according to predetermined patterns in response to predetermined events, an electrical field generator for creating a stimulus in the skin of the user's finger, a speaker for playing digital sound in response to different notifications or triggers received from another device or generated internally; and LED lights for changing color or blinking in response to different notifications or triggers received from another device or generated internally. The user input/output portion 512 may also include a close proximity gesture sensor for allowing touch-less interaction. For example, if a user's hands are occupied or dirty, the user can merely wave a hand or gesture to use the device 500.

The antenna portion 510 can include one or more types of antenna capable of receiving and transmitting electromagnetic waves from and to the target device 904 or the base device 906. The antenna portion 510 can be separate from tire transceiver 502 or implemented within the transceiver 502. The antenna portion 510 can include, for example, an RF antenna, a coil antenna and/or a capacitive plate antenna.

The power management portion 514 generally manages the power source 516 and controls power to other portions of the remote control device 500. The power management portion 514 can also include an energy harvesting function for generating electrical power for powering the remote control device 500 and/or charging the power source 516 by receiving power from another device such as the target device 904 or the base device 906. For example, the antenna portion 510 can receive power from the target device 904 or the base device 906. For example, an RF antenna can receive power via radio frequency communication, a coil antenna can receive power via magnetic coupling or a capacitive plate antenna can receive the power via capacitive coupling. The energy harvesting function of the power management portion 514 can use the received power for the portions of the remote control device 500. If the power source 516 is a rechargeable power source, the received power can be used to recharge the power source 516.

Figure 2A:
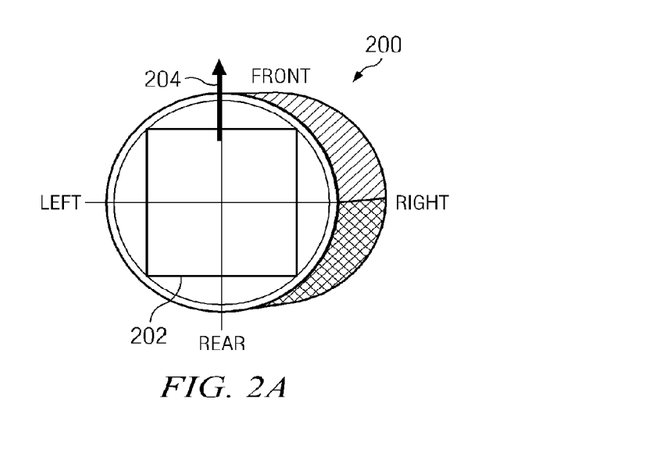
FIGS. 2A-2C are diagrams illustrating exemplary operating planes on the apparatus according to exemplary embodiments.

As discussed above, the controller 506 performs a self-orientation process to determine a forward direction of a plane of operation for defining the user gestures. Generally, the forward direction of the plane of operation is determined based upon the position of the user with respect to remote control device. Referring, to FIGS. 2A-2G, exemplary planes of operation and forward directions thereof will be discussed in detail. Referring to FIG. 2A, for purposes of discussion, front and rear portions and right and left sides of the remote control device 200 are shown. The front portion is illustrated with parallel line shading, while the rear section is illustrated with crossing parallel line shading. Further, for purposes of discussion, the intersection between the center vertical and horizontal axis can be defined as a center portion of the remote control device 200. The plane of operation 202 can exist on the remote control device 200. The user can make various motions over the plane of operation 202 that are detected by the touch sensor portion and defined as user gestures. That is, the plane of operation 202 defines an input space for the user to make user gestures.

Due to the symmetrical shape of the casing of the remote control device 200, an axis of or forward direction of the plane of operation 202 can be rotated with respect to the remote control device 200. Accordingly, signals representative of the user gestures can be transmitted substantially along the axis of the plane of operation. In the example shown in FIG. 2A, the forward direction 204 of the plane of operation 202 is substantially toward the front portion and the axis of the plane of operation intersects the center portion of the remote control device 200 at substantially 0 degrees. That is, in this example, the horizontal and vertical axes of the plane of operation exist on the same axes of the remote control device. This example may be applicable to a case in which the user is orienting the front portion of the remote control device 200 in the forward direction or away from the user.

Figure 2B:
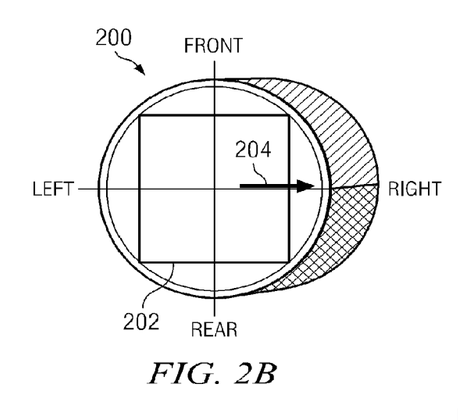

In the example shown in FIG. 2B, the forward direction 204 of the plane of operation 202 is substantially toward the right side and the axis of the plane of operation intersects the center portion of the remote control device 200 at substantially −90 degrees. That is, the horizontal and vertical axes of the plane of operation are located on the vertical and horizontal axes of the remote control device 200 (complementary). This example may be applicable to a case in which the user is pointing the right side of the remote control device 200 in the forward direction or away from the user.

Figure 2C:
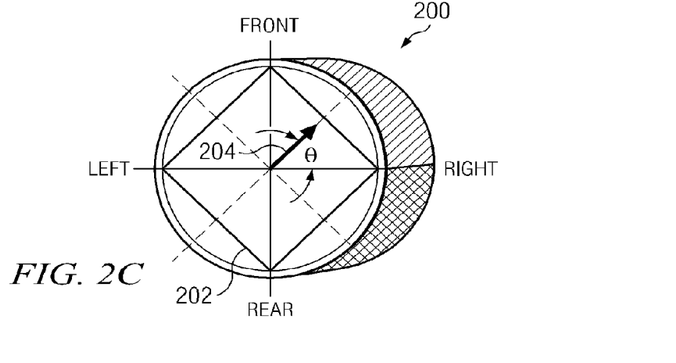

In the example shown in FIG. 2C, the forward direction 204 of the plane of operation 202 is substantially toward the front portion-right side and the axis of the plane of operation intersects the center portion of the remote control device 200 at substantially 45 degrees. That is, the horizontal and vertical axes of the plane of operation (dashed lines) are rotated 45 degrees from the horizontal and vertical axes of the remote control device 200 (solid lines). This example may be applicable to a case in which the user is pointing the front portion and right side of the remote control device 200 in the forward direction or away from the user.

Generally, the forward direction 204 of the plane of operation 202 and the axis of the plane of operation can intersect the center portion of the remote control device 200 at any angle. Accordingly, in comparison with the conventional remote control device, the user is not required to orient any particular portion of the remote control device 200 towards the target device.

Figure 6A:
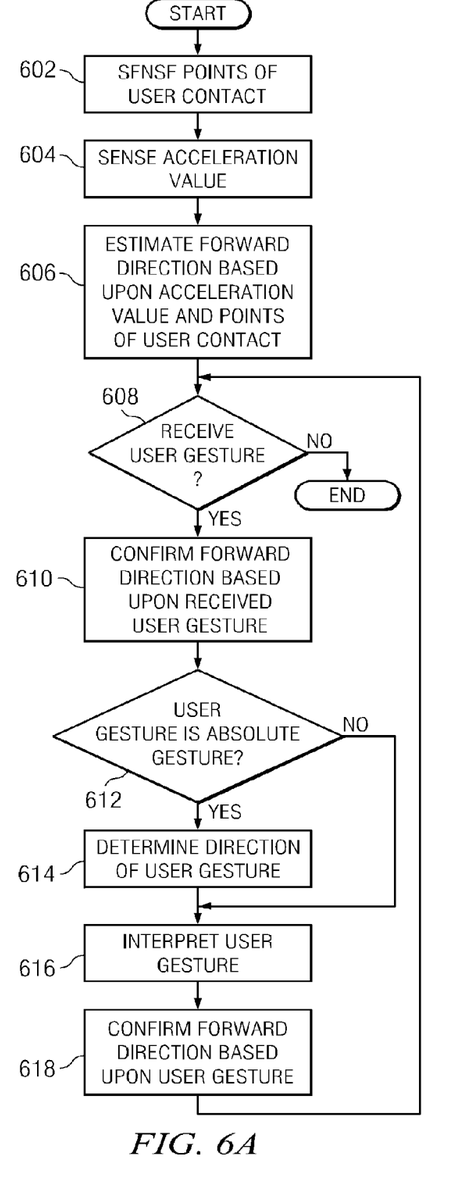
FIGS. 6A-6E are flow diagrams illustrating exemplary operations of the apparatus according to exemplary embodiments.

Referring to the flow diagram illustrated in FIG. 6A, operations performed by portions of the remote control device 500 for determining the forward direction of the plane of operation and interpreting user gestures will be discussed. At 602, the sensing group 508 senses points of user contact with fee remote control device 500. The points of user contact can be sensed by, for example, the touch sensor layer 410. Alternatively, a gesture motion history including data representative of the last known points of user contact can be accessed from the memory 504.

At 604, the sensing group 508 determines an acceleration value associated with the remote control device 500. The acceleration value can be determined by a set of accelerometers included among sensors of the sensing group 508.

At 606, the controller 506 of the remote control device 500 estimates the forward direction of the plane of operation based upon the acceleration value and/or the points of user contact. For example, when the remote control device 500 has been placed on a flat surface, the controller 506 may estimate the forward direction based upon the last known detected points of user contact which, may be stored in the memory 504 as gesture motion history. Alternatively, the controller 506 may estimate the forward direction to be the opposite direction of the detected gravitational field. Another alternative is for the user to input a calibration user gesture in a particular direction which the user desires to be defined as the forward direction of the operating plane.

After the initial estimation of the forward direction, if the user makes a user gesture on the operating plane (YES at 608), the controller 506 updates the estimation of the forward direction based upon the user gesture at 610. By estimating the forward direction of the operating plane, the operating plane will be automatically aligned with the orientation of the target device or the base device. Accordingly, a user can pick up the remote control device 500 without being preoccupied about the correct orientation. Another alternative is for the user to explicitly express the forward direction by making a non-symmetrical gesture or generally a wake-up gesture registered in advance into the memory. It no user gesture is made (NO at 608), the process ends.

Figure 7A:
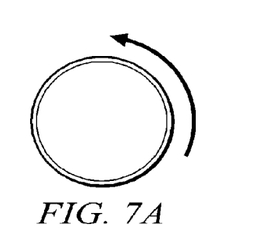
FIGS. 7A-7F are illustrations of exemplary user gesture types.
Figure 7B:
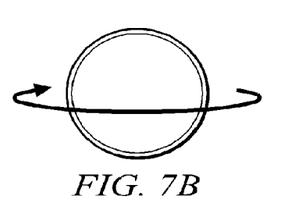
Figure 7C:
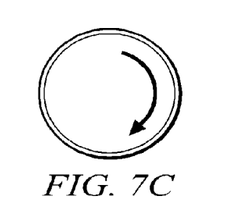
Figure 7D:
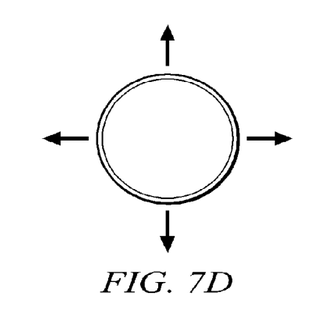
Figure 7E:
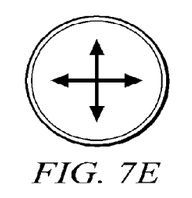
Figure 7F:
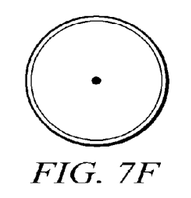

The types of user gestures include absolute-type gestures, relative-type gestures and point touch gestures. Example user gesture types are shown in FIGS. 7A-7F. Relative-type gestures include movement by the user to rotate the remote control device in a circumferential direction as shown in FIG. 7A, movement by the user to rotate the remote control device in a radial direction as shown in FIG. 7B or the rotational motion of the user's finger on the operating plane of the remote control device as shown in FIG. 7C. Absolute-type gestures include movement by the user of the remote control device in a particular direction as shown in FIG. 7D, or the motion of the user's finger in a particular direction on the operating plane of the remote control device as shown in FIG. 7E. A point touch gesture includes a slight pressing motion of a user's finger on the operating plane of the remote control device as shown in FIG. 7F.

At 612, the controller 506 determines if the user gesture is an absolute-type gesture. For example, when the set of accelerometers of the sensing group detect lateral or longitudinal type movement of the remote control device, the controller 506 can determine the motion to be absolute-type motion by comparing the acceleration values to the gyroscope and/or compass values. For touch gestures, the trajectory of the gesture can be analyzed to determine if it is an absolute-type gesture. If the user gesture is determined to be an absolute-type gesture (YES at 612), at 614 the controller 506 determines a direction of the absolute-type user gesture. The direction can be determined by, for example, sensing values obtained by the digital compass of the sensing group 508 and/or comparisons with the detected forward direction of the operating plane.

If the controller 506 determines that user gesture is not an absolute-type gesture (NO at 612), or after the direction of the of the absolute-type user gesture has been determined, at 616 the controller interprets the user gesture as a user command. The user gesture is interpreted depending on the interface state. The user gesture is described by the following characteristics transmitted by the controller to the target device: Gesture type; Gesture direction and Gesture extent. For instance, if a phone call is received by the base device, the user can do a tick gesture on the top of the remote control device to accept the call or a cross gesture to refuse the call. The user could also simply shake the device to refuse the call or tap the top surface to accept. Once the call is established, the user can rotate the device to the right to increase the volume or to the left to decrease the volume. To hang up, the user can realize the same gestures reserved for refusing a call. These rules are defined in the user interaction logic of the application running into the base device, and do not need to be implemented into the controller of the remote control device. The interpretation of the command by the controller can be based on simple pattern matching, which can be aided by the knowledge of the user identification. Pattern matching algorithm can be simple Dynamic Programming, Neural Network, HMM, etc. The user commands can than be transmitted to the target device 904. The target device can further interpret this command as an increase or decrease in volume, change in display format, etc.

At 618, the controller 506 again confirms or updates the estimation of the forward direction based upon the user gesture. Then, the routine returns to 608 to begin operations on another user gesture.

The above operations can be done by the controller 506 configured according to instructions stored in the memory 504 to operate as a gesture type determining device for determining if the user gesture is an absolute-type gesture or a relative-type gesture; a gesture direction determination device for determining a direction of the absolute-type gesture and the relative-type gesture; and a gesture interpretation device for interpreting the absolute-type gesture and relative-type gestures as user commands.

An exemplary process for estimating the forward direction of the plane of operation based upon the acceleration value and/or the points of user contact at 606 will be discussed in detail. The time series of the acceleration data is collected in the form of a three dimension data vector A=(accx, accy, accz). The standard deviation of the three dimension data vector A over a time window of a predetermined length is then compared to a threshold value to establish if the remote control device 500 is resting on a support or in the hand of the user. If it is in the hand of the user, the pairing process discussed below with respect to FIGS. 6B-6C can be performed if requested by the base device.

If the remote control device 500 is detected to be at rest, the acceleration vector is compared to the gravity vector to find the inclination of the base plane of the device with respect to the local terrestrial horizontal plane. If the inclination is greater than 45 degrees, the forward direction of operation can be define by the direction of the (−accx, −accy, 0) vector when the remote control device 500 is at rest. If the support plane has low vertical inclination, the points of contact can be used to estimate a forward direction of operation. To this effect, a classifier is first used to identify the type of holding pattern based on the vector of the points of contact values C=(C1, C2, . . . , Cn), where Cx denotes the intensity of the touch on the x touch sensor (e.g. capacitance measured by a capacitive sensor). Such a classifier can be for instance an artificial neural network trained on the combination of recorded observation vector C and the manually observed pattern during recording (left hand 4 finger fork grab, left hand 4 finger circle grab, left hand 2 finger grab, right hand 4 finger fork grab, etc). The number of groups can be adjusted based on the user observation and the performance of the overall direction estimation algorithm.

Once the grab pattern has been estimated, the forward direction is computed using a locally linear multi-dimensional regression analysis (MRA). In this case, the relationship between the points of contact and the forward direction is assumed to be locally linear (sometimes referred to as piecewise linear) after solution of the grab pattern classification problem, which yields a grab pattern g. This linear relationship between forward direction angle (with respect to the device reference) and sensor pattern may be expressed by the following equation where T is the angle and R is the regression matrix parameterized by the discrete estimator g:

$T = Rg \cdot C$

An exemplary process for updating or confirming the estimation of the forward direction of the plane of operation based upon the user gesture at 610 will be discussed in detail. Once the forward direction is initially estimated at 606, each absolute gesture will be interpreted with respect to the current estimation of the forward direction. Once the type of gesture has been determined, the controller can then compare the current forward direction estimation to the forward direction expected from the observed gesture trajectory. For example, if the gesture is an up gesture, the forward direction is expected to be in the direction of the gesture. The forward direction estimator can then be adjusted to minimize its deviation to the expected direction using a smoothing factor, e.g.:

$FE(n+1) = (1-\text{alpha})*FO(n) + \text{alpha}*FE(n)$, where $FE(n+1)$ is the forward direction estimated after gesture n (expressed as a vector in the device reference) and $FO(n)$ is the forward direction expected after gesture n.

Figure 6B:
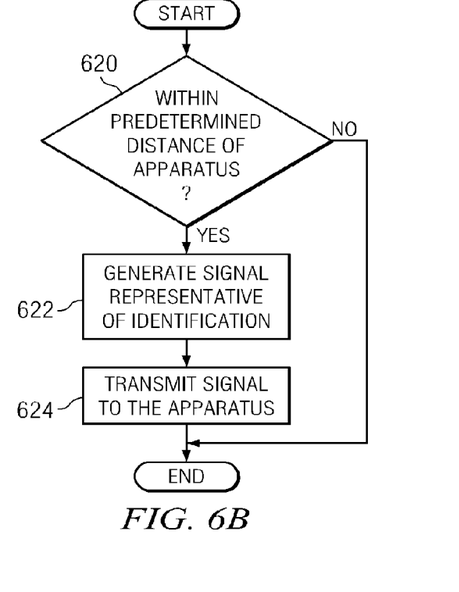

Referring to the flow diagram illustrated in FIG. 6B, operations performed by portions of the remote control device 500 for pairing with the target device or the base device will be discussed. Pairing refers to a process the remote control device 500 performs to associate with another device so that the two can successively transmit and receive signals from each other and process the signals.

At 620, the controller 506 determines if the remote control device 500 is within a predetermined distance of another device such as the base device or the target device. For example, a proximity sensor included among the sensing group 508 can sense when the remote control device 500 is in contact with or very near the base device or the target device. If the remote control device 500 is within the predetermined distance. (YES at 620), at 622 the controller 506 generates a signal representative of an identification of the device 500. At 624, the transceiver 502 transmits the signal to the base device or the target device and the process ends. If the remote control device 500 is not within the predetermined distance (NO at 620), then the process ends without sending the identification.

Figure 6C:
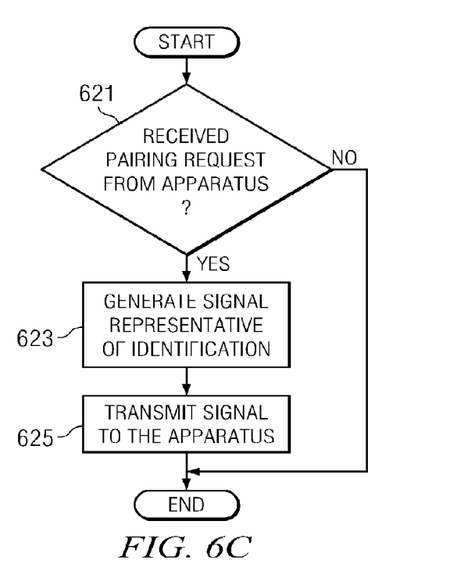

In an alternative embodiment shown in FIG. 6C, at 621 the controller 506 determines if the remote control device 500 has received a pairing request to associate the remote control device 500 from another apparatus such as the base device or the target device. The request can be received by the transceiver 502 or the user input/output, portion 512.

If the remote control device has received the request (YES at 621), at 623 the controller 506 generates the signal representative of an identification of the remote control device 500. At 624, the transceiver 502 transmits the signal to the apparatus from which the request originated and the process ends. If the remote control device 500 does not receive a request. (NO at 621), then the process ends without sending the identification.

The signal representative of the identification of the remote control, device can include, for example, characteristics particular to the antenna portion 510, the identification particular to the device stored in the identification portion 518 or a particular gesture registered into the memory as a wakeup gesture.

Figure 6D:
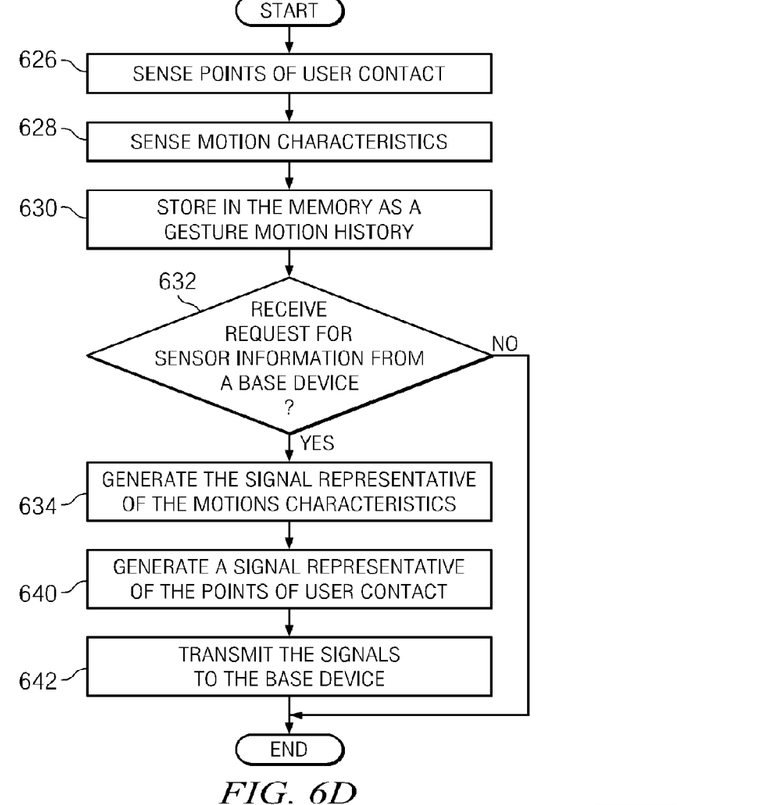

Referring to the flow diagram illustrated in FIG. 6D, operations performed by portions of the remote control device 500 for sharing user characteristics will be discussed. Sharing refers to a process the remote control device 500 performs to transmit user characteristics to another device such as the base device so that it can distinguish between different users.

Accordingly, the base device can automatically identify the user and activate a particular profile associated with the user without having to explicitly request a user identification.

At 626, the sensing group 508 senses points of user contact with the remote control device 500. For example, the touch sensor portion 410 can detect where the user's fingers are touching relative to a normal position of a hand, including whether the hand is a right or left hand. At 628, the sensing group 508 senses motion characteristics associated with the user of the remote control device 500. For example, the accelerometer, gyroscope and/or compass included among the sensing group 508 can sense the user tremor pattern and/or a user movement range.

At 630, the controller 506 stores the points of user contact and the motion characteristics as gesture motion history in the memory 504. At 632 the remote control device 500 determines if it has received a request for sensor information related to the user from, for example, the base device. The request can be received by the transceiver 502 or the user input/output portion 512.

If the remote control device 500 has received the request (YES at 632), then at 634 the controller 506 generates a signal representative of the motion characteristics. Particularly, here the controller 506 shifts the data for the motion characteristics which is represented in the time domain to data represented in the frequency domain. Then, the controller 506 extracts low-dimensional data with high discriminating properties from the data represented in the frequency domain. The controller 506 generates a signal including the low-dimensional data with high discriminating properties as the signal representative of the motion characteristics.

For example, the time series of the acceleration data can be shifted into the frequency domain using a discrete wavelet transform. The filter-bank three can be optimized to reinforce the decomposition resolution around the typical hand tremor frequencies. Frequency components outside of the range of interest (low frequencies, very high frequencies) can be disregarded. The output of the filter-bank can be integrated over time and packed into a vector, to which one can append the first and second order derivatives (delta and acceleration coefficient). Alternatively, the filter-bank terminal node outputs can be compressed using a logarithmic law and a DCT can be applied thereafter. Delta and acceleration values can then be computed and appended to the vector.

At 640, the controller 506 generates a signal representative of the points of user contact. At 642, the transceiver 502 transmits the signals to the base device. The process ends here for the controller 506. The base device can perform operations to determine the user of the remote control device 500 by, for example, comparing the points of user contacts and motion characteristics with data associated with know users stored at a memory at the base device.

If the remote control device 500 does not receive the request (NO at 632), the process can end. If a request is received at a later time, the process can continue from 634.

The operations performed by portions of the remote control device 500 for sharing user characteristics can be performed in a different order from described above. For example, the controller 506 can wait until a request is received until beginning to store the gesture motion history and points of user contact in the memory. Also, the controller 506 could perform the operations for generating a signal including tire low-dimensional data with high discriminating properties as the signal representative of the motion characteristics before receiving the request. Alternatively, the controller 506 can send only one of the motion characteristics and the points of riser contact to the base device rather than both.

Figure 6E:
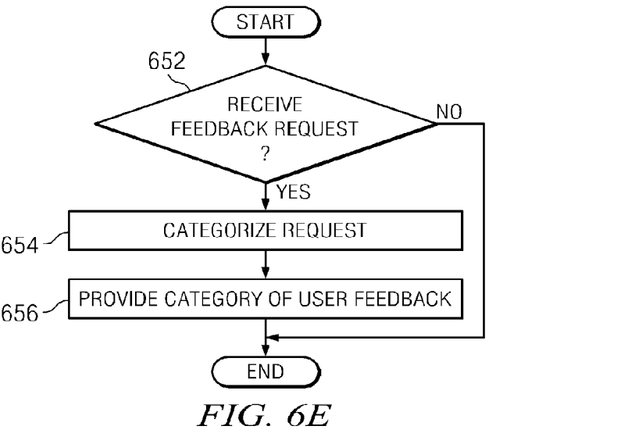

Referring to FIG. 6E, operations performed by portions of the remote control device 500 for providing feedback to the user will be discussed. At 652 the remote control device 500 determines if it has received a user feedback request from the base device or the target device. The request can be received by the transceiver 502 or the user input/output portion 512.

If the remote control device has received the request (YES at 652), then at 654 the remote control device 500 categorizes the request. Particularly, the user input/output portion 512 of the remote control device 500 can include multiple feedback mechanisms to inform users of different device events such as, for example, a vibration mechanism, an electrical field generator, a speaker and LED lights. The requests may be sent by the target device or the base device in response to events. For example, the target device or the base device may request for the remote control device to vibrate tor a certain system event, for the speaker to output particular sounds in response to alerts, or for the LED lights to change colors and/of blink in a predetermined pattern in response to different notifications and alerts. The request may also be generated by the user of the remote control device. Accordingly, the controller categorizes the request so that the feedback can be tailored to the request. For example, a request for the remote control device to vibrate can be put in a category associated with vibration related events, while a request for the remote control device 500 to output a certain color display pattern can be associated with LED related events.

At 656, the controller 506 controls the user input/output portion 512 to provide the appropriate feedback in accordance with the category of the request. If the remote control device does not receive the request (NO at 652), then the process ends.

One exemplary case of feedback being provided to the user will be discussed. As discussed above, the remote control device 500 includes a power management portion 514 and a power source 516 that can be rechargeable. When the remote control device 500 is in contact or near contact with a base device, the base device may begin recharging the power source 516 by, for example, an inductive or other wireless charging schemes. The power management portion 514 makes an indication that it is in a recharging status, which is detected by the controller 506. The controller 506 can make the LEDs of the user input/output portion 512 display a certain color to indicate that the remote control device 500 is in a recharging state. In this case, the wireless power being sent from the base device to the remote control device 500 can serve as the request of 652.

Figure 8A:
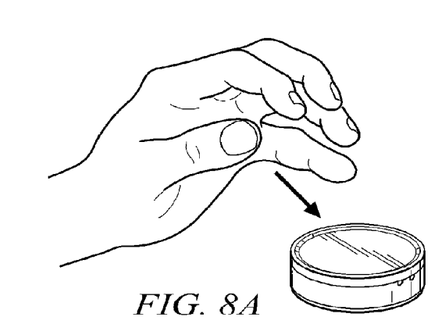
FIGS. 8A-8E are illustrations of an exemplary use cases of the apparatus.
Figure 8B:
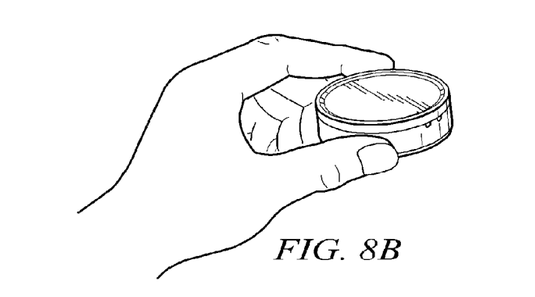
Figure 8C:
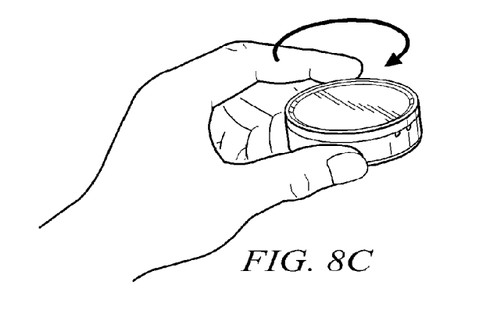

Referring to FIGS. 8A-8C, a first exemplary use scenario for the remote control device 500 will be discussed. As shown in FIG. 8A, the remote control device 500 is in an idle state. As shown in FIG. 8B, the user initially contacts the remote control, device 500 and awakes it from an idle state. The above operations discussed with reference to FIG. 6A can begin here. As shown in FIG. 8C, the user rotates the remote control device 500. This user gesture is interpreted by the remote control device, and transmitted to the target device.

Figure 8D:
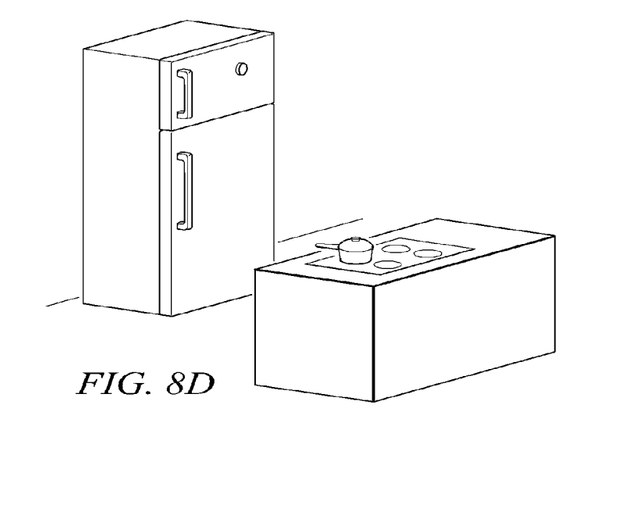
Figure 8E:
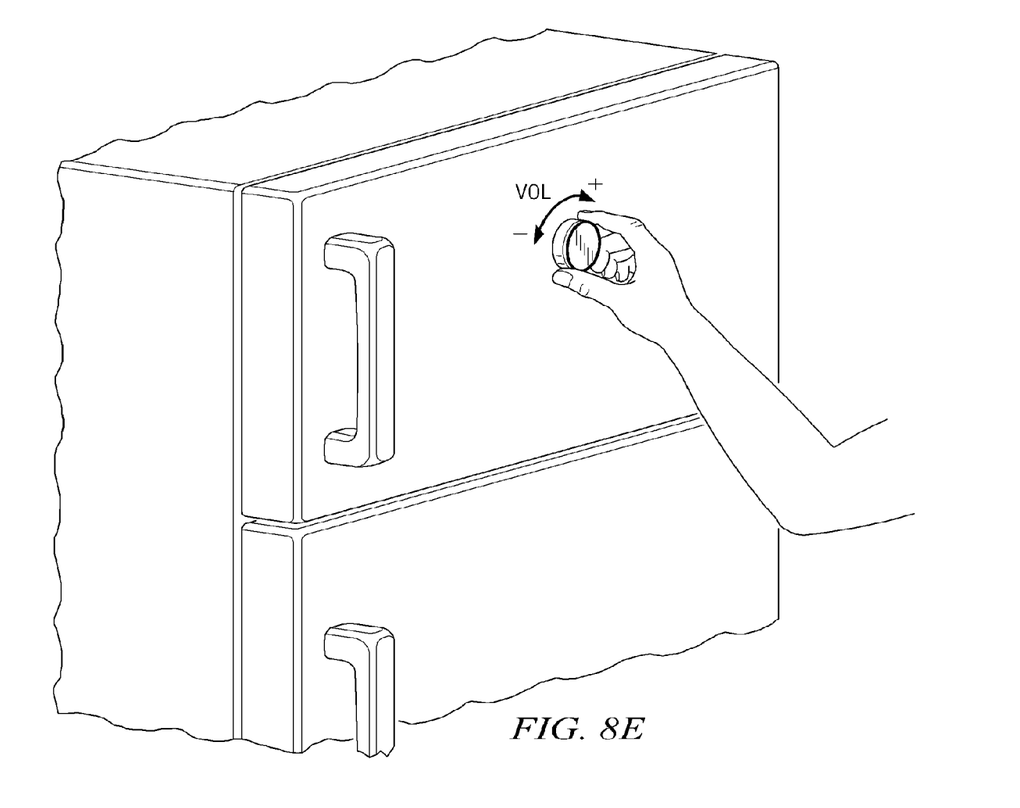

Referring to FIGS. 8D-8E, a second exemplary use scenario for the remote control device 500 will be discussed. As shown in FIG. 8D, the remote control device 500 is in an idle state and held on a vertical surface such as the door of a refrigerator. The device 500 can be held by, for example, the magnetic portion 412. As shown in FIG. 8E, the riser rotates the remote control device 500 clockwise or counterclockwise to increase or decrease the volume of the output of the target device while it remains on the vertical surface. The rotation of the remote control device 500 automatically awakes it from the idle state to begin determining the forward direction of the plane of operation and then to interpret the user gesture.

Figure 10A:
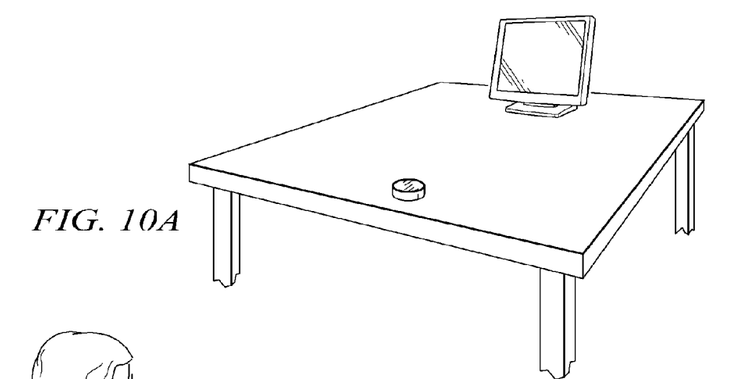
FIGS. 10A-10D are illustrations of an exemplary use case of the apparatus.
Figure 10B:
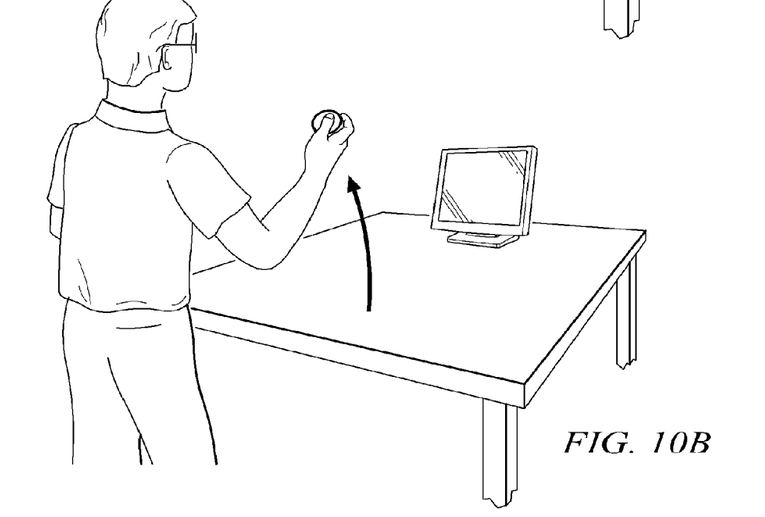
Figure 10C:
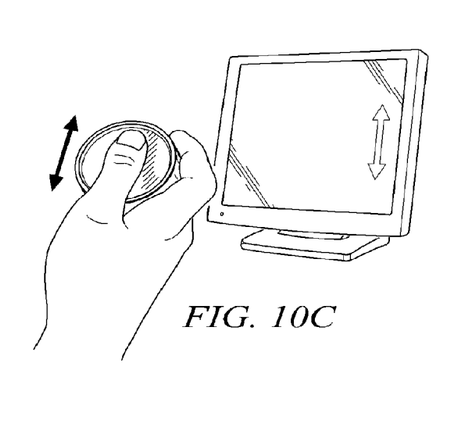
Figure 10D:
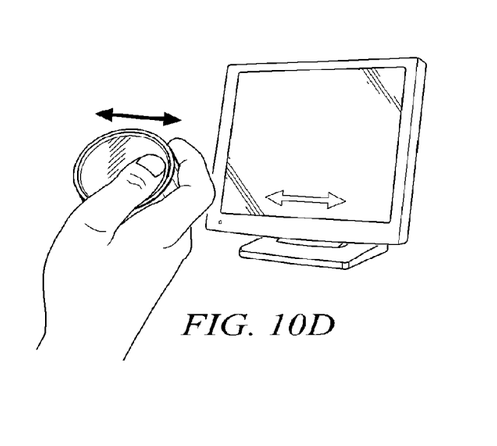

Referring to FIGS. 10A-10D, a third exemplary use scenario for the remote control device 500 will be discussed. As shown in FIG. 10A, the remote control device 500 is in an idle state and on a horizontal surface such as a table. As shown in FIG. 10B, the user picks up the remote control device 500 and automatically awakes it from the idle state to begin determining the forward direction of the plane of operation. As shown in FIGS. 10C-10D, the user slides a finger forward or backward and left or right to move the screen display of the target device.

Figure 11:
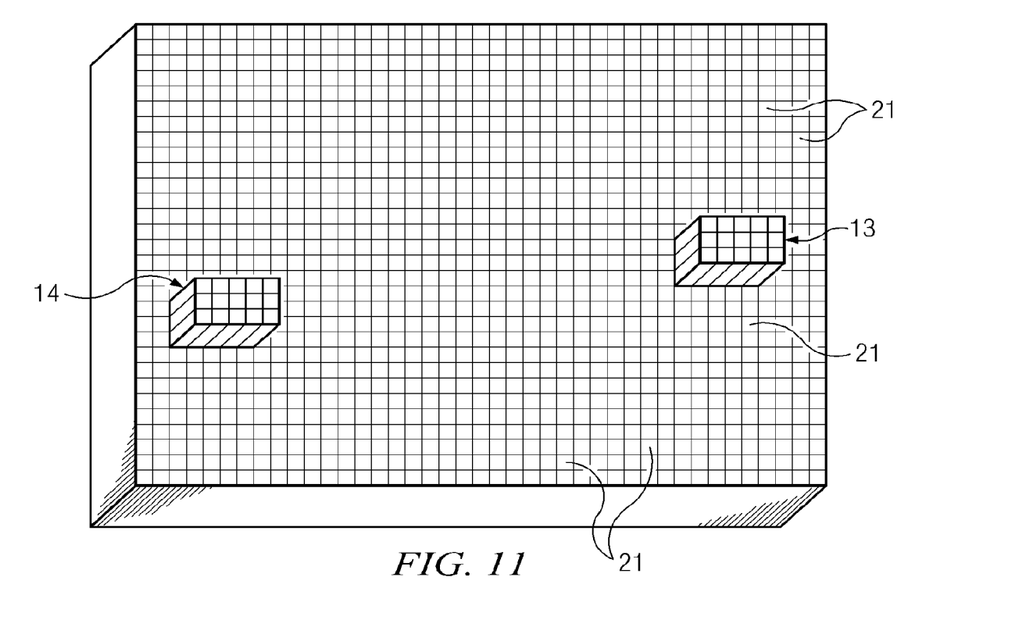
FIG. 11 is an illustration of a portion of the apparatus in accordance with an exemplary embodiment.
Figure 12:
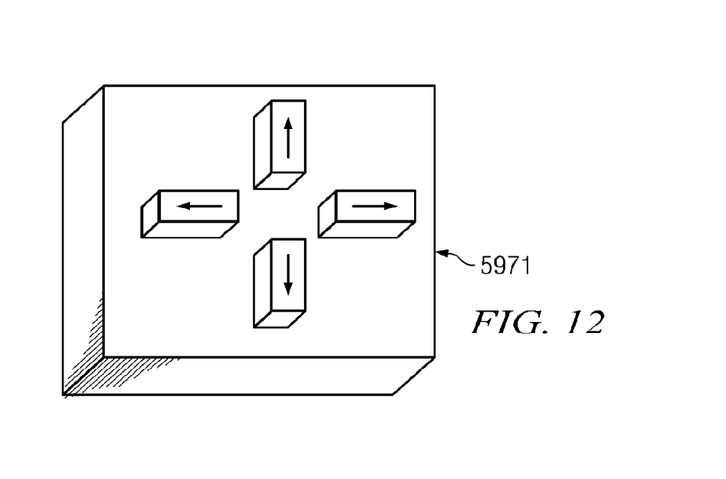
FIG. 12 is an illustration of a portion of the apparatus in accordance with an exemplary embodiment.

Referring to FIGS. 13-12, an alternative embodiment for the remote control device will be discussed. A portion of the remote control device such as, for example, the top portion 402 can include a reconfigurable surface having elevation units 21 situated in a matrix arrangement that adjust a physical shape of an input and output surface area. Further, a flexible surface with a selectively variable shape can cover the elevation units 21. The elevation units 13 and 14 can be selectively raised to form part of a tactile physically clickable input (e.g., a key, button, joystick, etc.) to allow the user to adjust certain properties of the remote control device 300, or those of the base device and target device. The clickable input can provide a tactile and audio feedback of the click sensation.

An elevation unit control component, which can be the controller 506, can control adjustments (e.g., raising, lower, etc.) in one or more of the elevation units 21. The sensing group 508 can include an actuation sensing component for sensing actuation activity associated with the shape of the elevation units 21. Accordingly, the flexible surface on the elevation units 21 and actuation sensing component interact to provide both input and output to a user of the remote control device 300. As shown in FIG. 12, the reconfigurable surface can be utilized to provide direction input keys 5971.

The reconfigurable surface can be configured as a portion of the touch sensor layer 410 in a case in which the touch sensor layer 410 is disposed on a top surface of the device 500. In one exemplary case, with respect to the operations performed by portions of the remote control device for providing feedback to the user as discussed with, respect to FIG. 6E, the controller 506 can raise certain elevation units 21 at 656 in response to a request from, for example, the target device to provide control inputs. In another exemplary case of telephony applications, the controller 506 can raise certain elevation units 21 to serve as physical touch buttons to control telephone call operations like on/off hook, redial, mute, etc.

Other embodiments will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An apparatus for communicating with a target device comprising:
   a sensing portion for sensing points of user contact with the apparatus, user gestures, and one of an acceleration value or an orientation value of the apparatus;
   a transmitting device for sending signals representative of user commands to the target device;
   a controller;
   a memory including instructions for configuring the controller to:
      perform a self-orientation process based upon at least one of the acceleration value, the orientation value and the points of user contact to determine a forward direction of a plane of operation for defining the user gestures, wherein an axis of the determined plane of operation can substantially intersect the apparatus at all angles;
      determine if the user gesture is an absolute-type gesture or a relative-type gesture;
      determine a direction of the absolute-type gesture if the user gesture is the absolute-type gesture; and
      interpret the absolute-type gesture and relative-type gesture as user commands, wherein the relative-type gesture includes rotation of the apparatus.

2. An apparatus comprising:
   a sensing portion for sensing points of user contact with the apparatus and one of an acceleration value and an orientation value of the apparatus;
   a controller; and
   a memory including instructions for configuring the controller to:
      classify the points of user contact into a holding pattern;
      perform a self-orientation process based upon at least one of the acceleration value, the orientation value and the holding pattern to define a forward direction of user gestures, wherein the forward direction can be fixed along any angle with the apparatus;
      determine if the user gesture is an absolute-type gesture or a relative-type gesture, wherein the relative-type gesture includes rotation of the apparatus.

3. The apparatus according to claim 1, wherein a gyroscope measures angular rotation associated with the apparatus to produce the orientation value.

4. The apparatus according to claim 1, wherein the axis of the determined plane of operation can substantially intersect the apparatus at four different angles perpendicular to each other.

5. The apparatus according to claim 4, wherein the four different angles are 0, 90, 180 and 270 degrees.

* * * * *